Oct. 31, 1939.  A. M. A. FERTÉ ET AL  2,177,803
AGRICULTURAL MACHINE
Filed Jan. 27, 1938   9 Sheets-Sheet 4
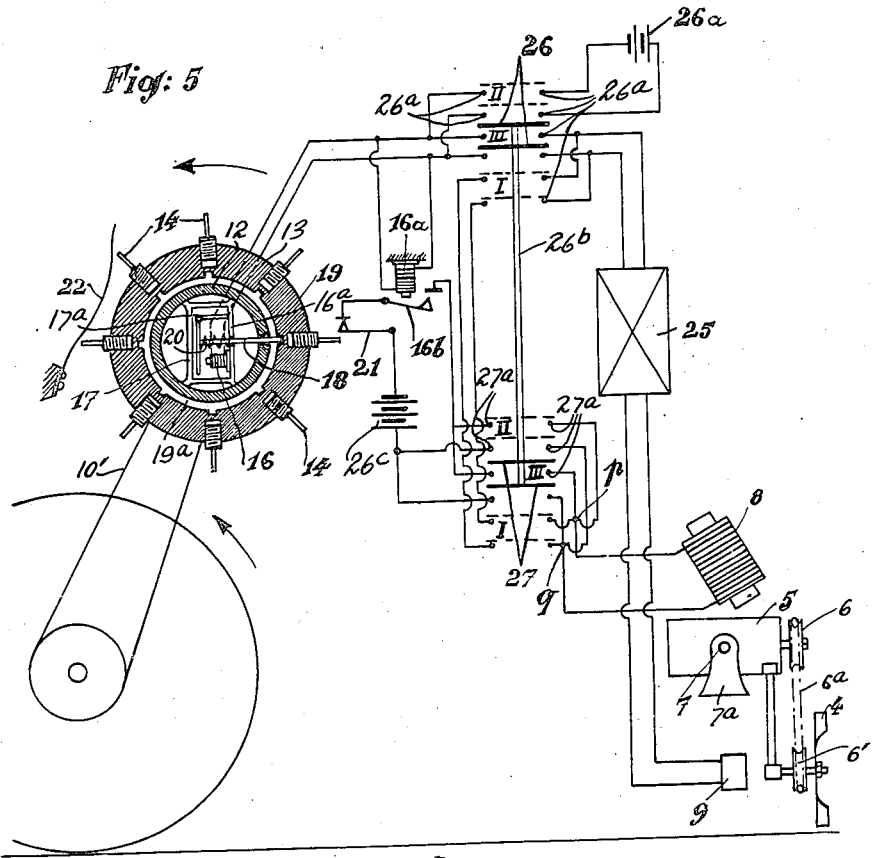
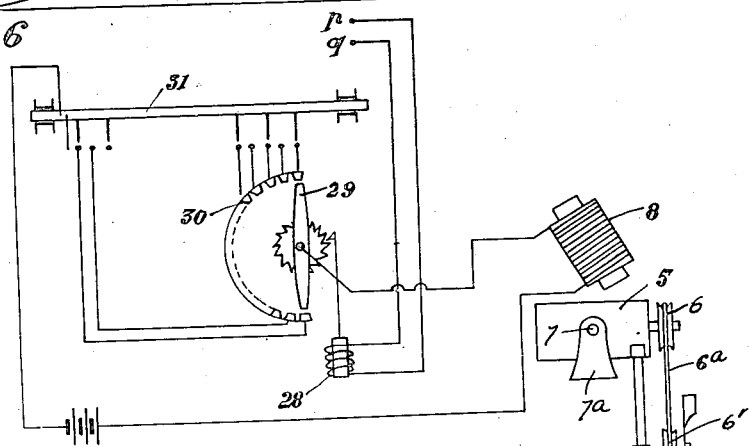
INVENTORS
ANDRÉ MARIE AUGUSTE FERTÉ
AND ANDRÉ BALP
BY Richard K. Stevens
ATTORNEY

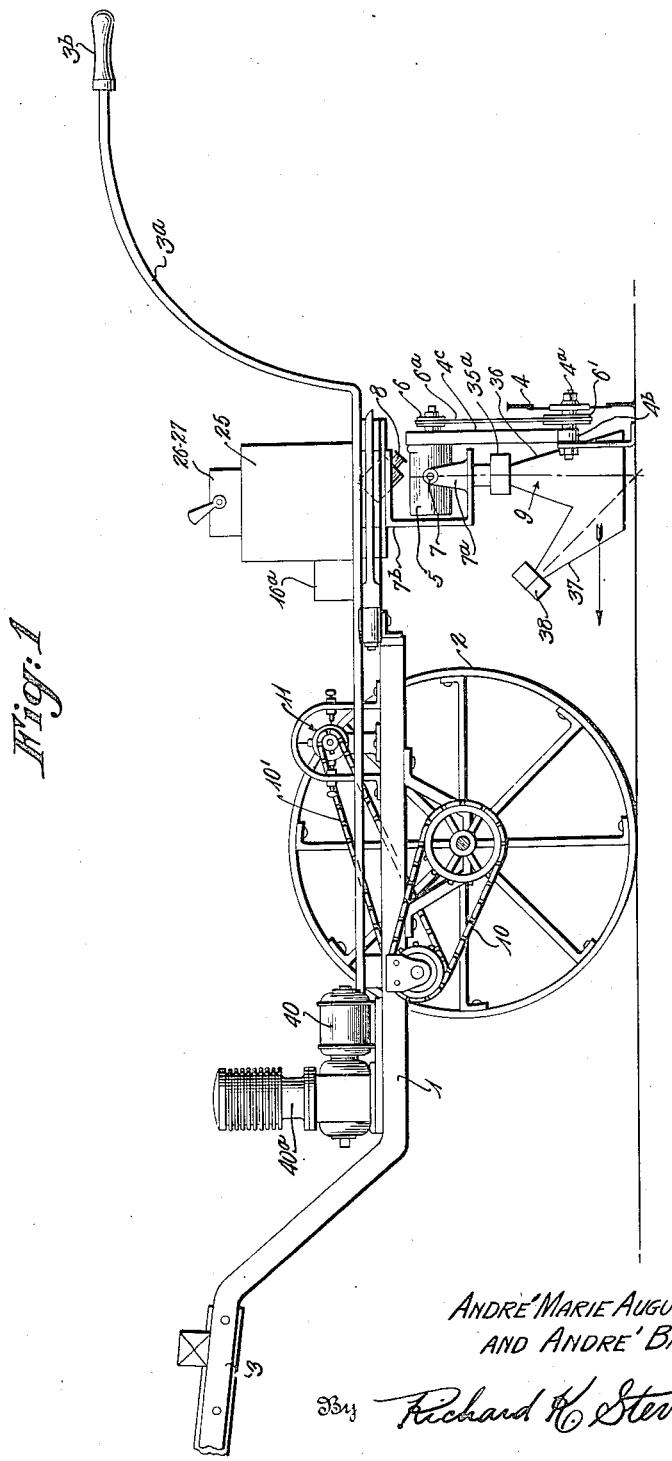

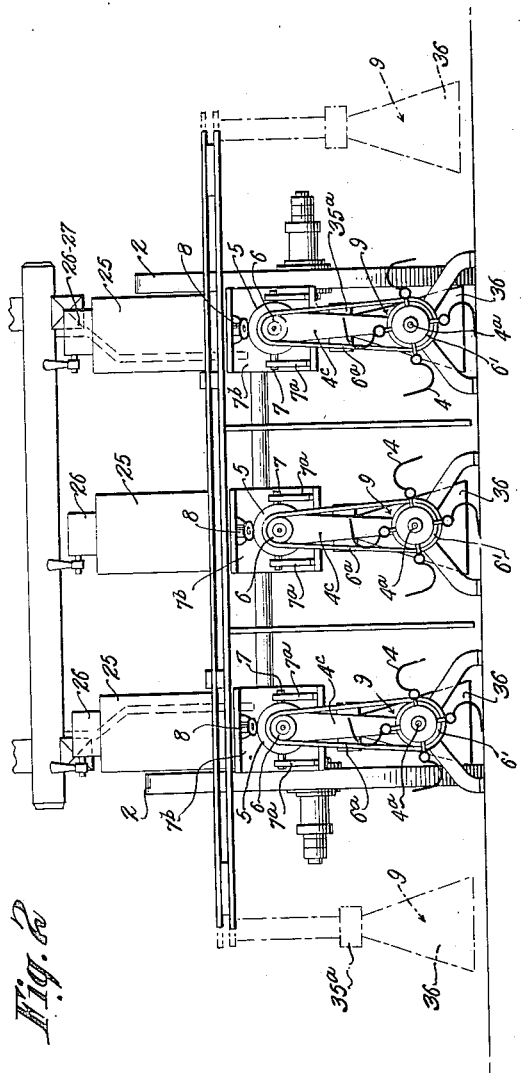
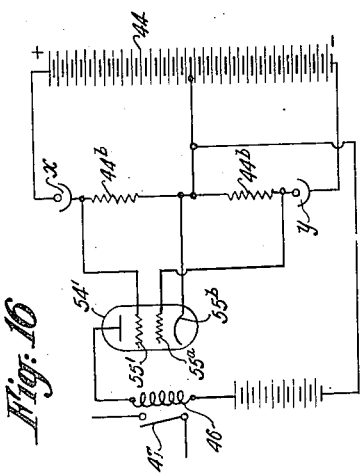
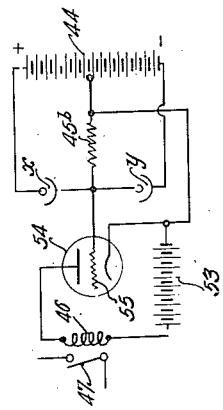

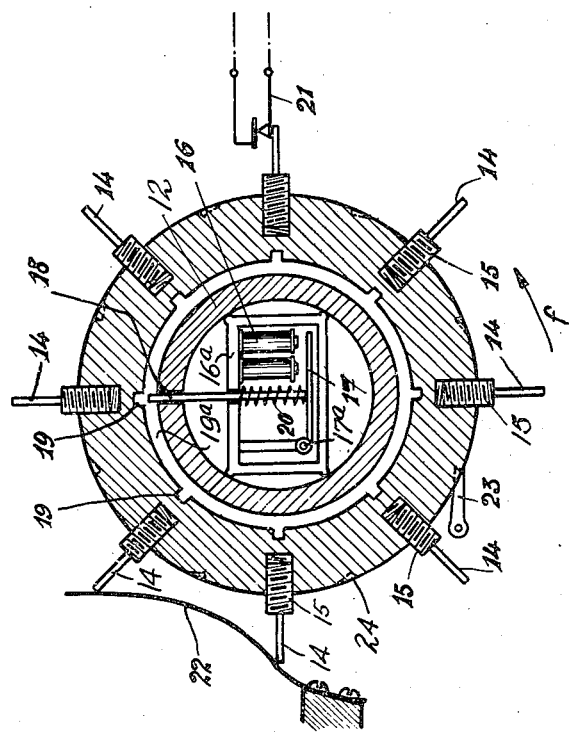
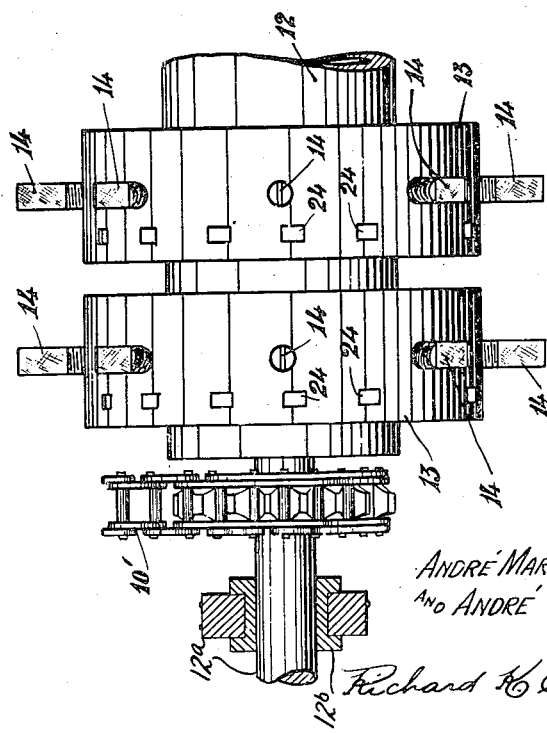

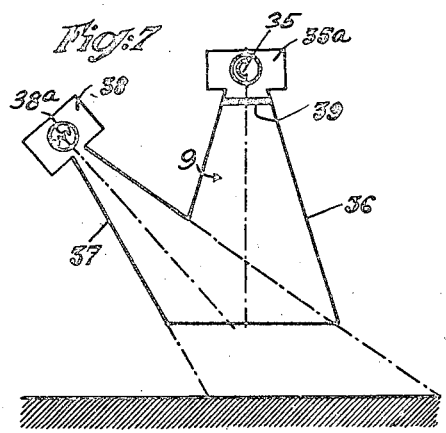
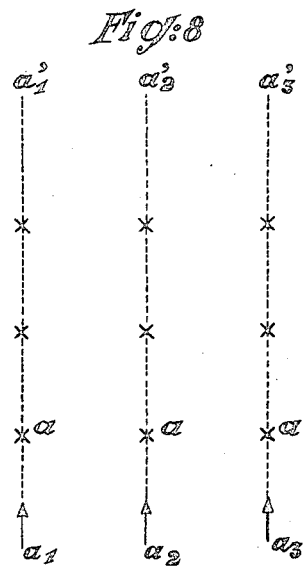
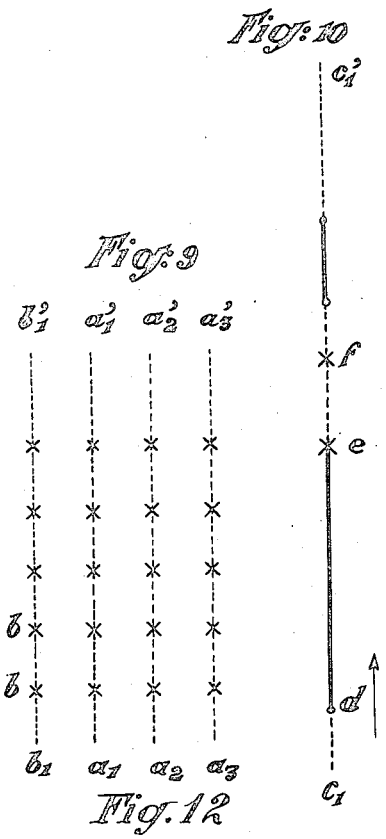
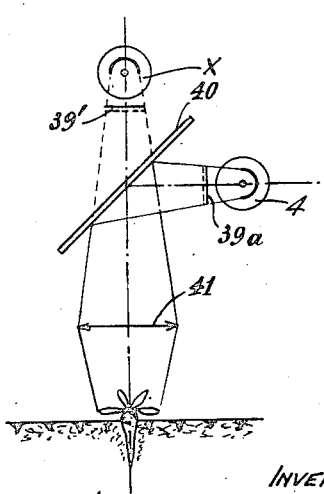
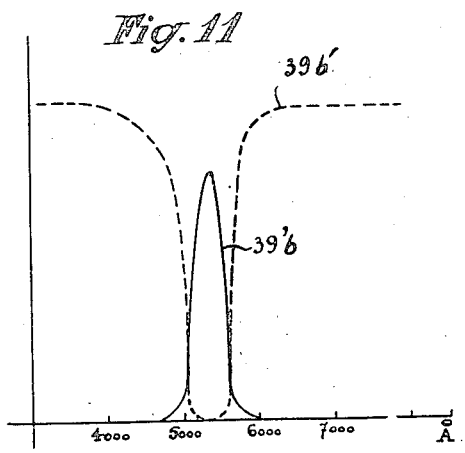

Oct. 31, 1939. A. M. A. FERTE ET AL 2,177,803
AGRICULTURAL MACHINE
Filed Jan. 27, 1938 9 Sheets-Sheet 6
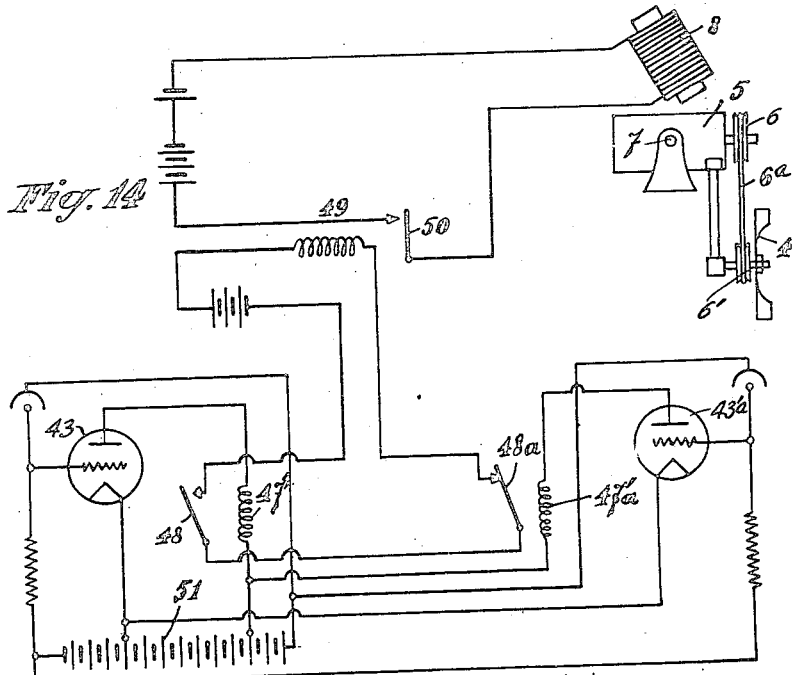
Fig. 14
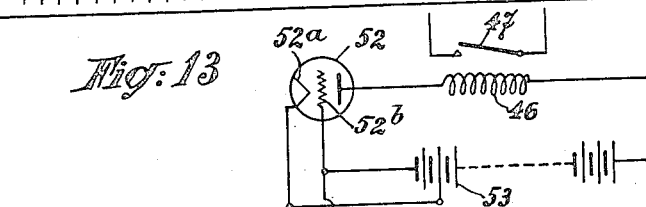
Fig. 13
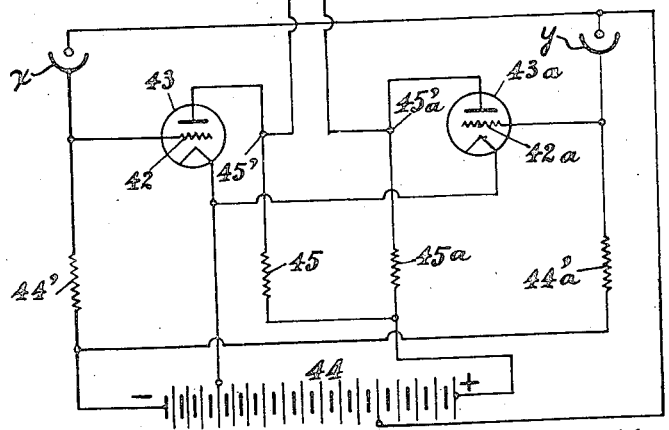
INVENTORS
ANDRÉ MARIE-AUGUSTE FERTÉ
AND ANDRÉ BALP
BY Richard H. Stevens
ATTORNEY Oct. 31, 1939.   A. M. A. FERTÉ ET AL   2,177,803
AGRICULTURAL MACHINE
Filed Jan. 27, 1938   9 Sheets-Sheet 7
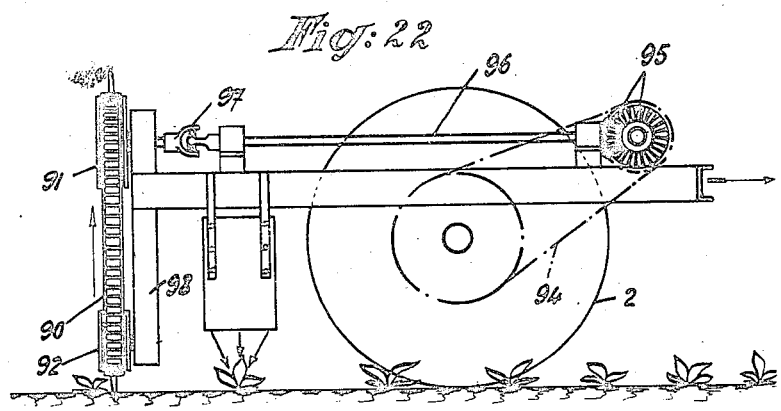
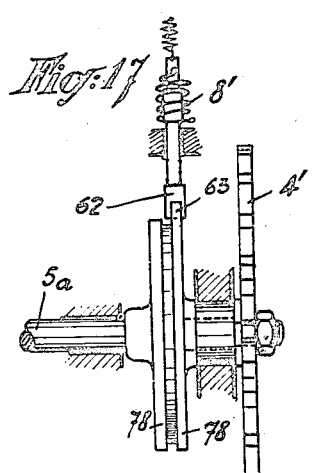
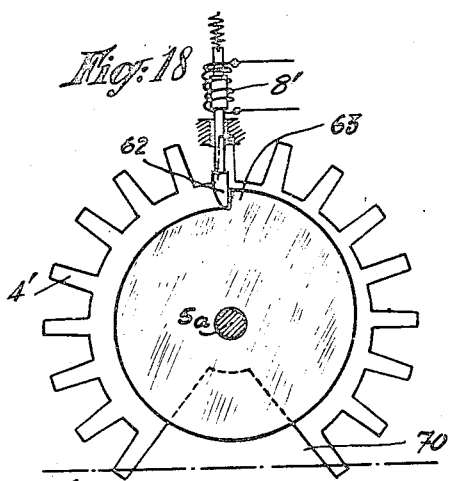
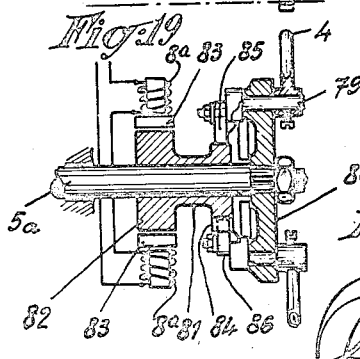
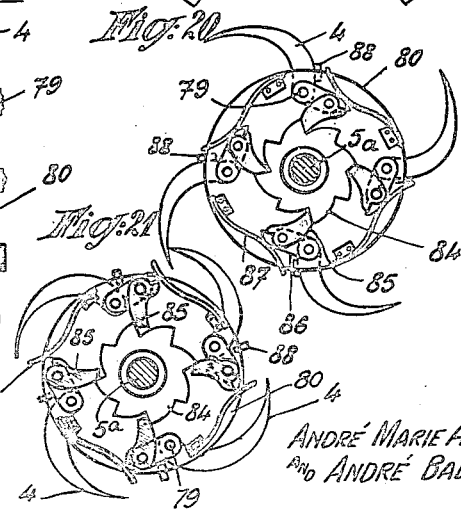
INVENTORS
ANDRÉ MARIE AUGUSTE FERTÉ
AND ANDRÉ BALP
BY Richard K. Stevens
ATTORNEY Oct. 31, 1939.                A. M. A. FERTÉ ET AL                2,177,803
                                AGRICULTURAL MACHINE
                              Filed Jan. 27, 1938           9 Sheets-Sheet 8

INVENTORS
ANDRÉ MARIE AUGUSTE FERTÉ
AND ANDRÉ BALP
BY Richard H. Stevens
                    ATTORNEY

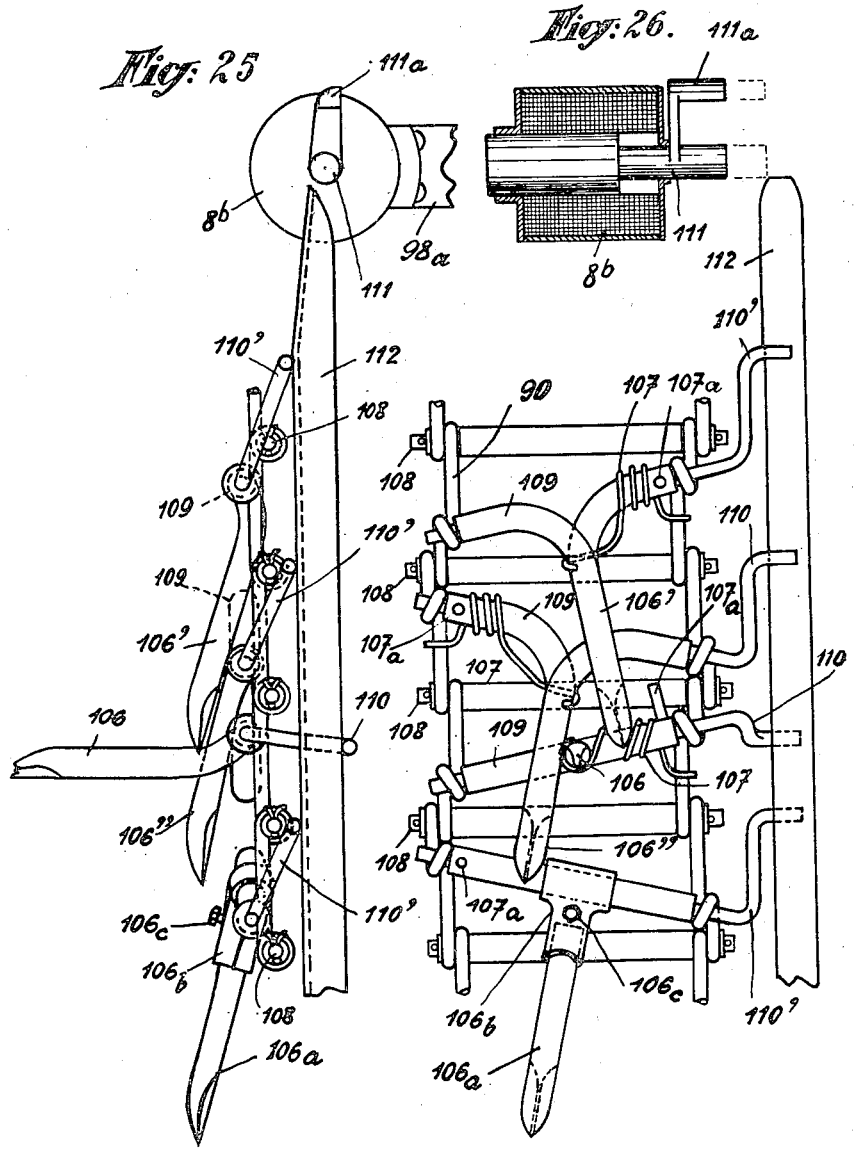

Patented Oct. 31, 1939

2,177,803

UNITED STATES PATENT OFFICE 2,177,803

AGRICULTURAL MACHINE

André Marie Auguste Ferté, Terny Par Margival, and André Balp, Paris, France

Application January 27, 1938, Serial No. 187,325
In France March 18, 1937

25 Claims. (Cl. 97—45)

Most of the vegetable and industrial plants or roots require hoeing or breaking of the ground not only in the interval between the ridges, formed in a regular manner by the drill, but also between the shoots already separated from one another, that is to say in the ridges.

Furthermore, certain seed beds of plants such as beetroot, Indian corn, turnips, canary seed, etc., must be thinned in such manner as to leave the shoots at a given distance from one another.

It is very difficult to devise automatic machines for these particular uses and other analogous uses because these machines are blind and too often destroy the plants. This is the reason for which the automatic machines which have been used up to this time did not prove satisfactory.

The object of the present invention is to provide a machine of this kind which obviates these drawbacks.

The essential feature of the present invention consists in the use of a photo-electric cell capable of reacting differently according to the differences of luminous intensity and of colour for controlling the automatic machine.

According to our invention, the machine is automatically controlled by one or more photo-electric cells responsive to variations of the radiations emitted by certain plants and the surrounding matters. Said cell or cells may be provided for this purpose with suitable screens or filters of suitable colors, so that the cell or cells receive only the radiations capable of energizing them, in particular radiations emitted by the vegetables that are considered or by marking members located on the ground, and thus control the working of the machine.

Other features of the present invention will result from the following detailed description of some specific embodiments thereof.

Preferred embodiments of the present invention will be hereinafter described, with reference to the accompanying drawings, given merely by way of example, and in which:

Fig. 1 is a side elevational view of a machine according to the invention;

Fig. 2 is a rear view corresponding to Fig. 1;

Fig. 3 is a sectional view of a rotary switch driven by the wheels of the vehicle;

Fig. 4 is a partial plan view, showing the arrangement of two switches corresponding to two different tools on a common cylinder serving to the drive thereof;

Fig. 5 is a diagram of the electrical connections corresponding to one of the tools;

Fig. 6 shows the connections of an automatic switch of the kind of those used in telephony, interposed between the photo-electric cell and the electro-magnet which raises a tool;

Fig. 7 is a diagram of the arrangement of a photo-electric cell;

Figs. 8, 9 and 10 are diagrams showing plantings intended to illustrate the operation of the machine according to the invention;

Fig. 11 diagrammatically shows a control system including two photo-electric cells mounted in a differential manner;

Fig. 12 shows the curves of light transmission of the selecting filters associated with the two respective cells;

Fig. 13 shows an example of the circuits controlled by the cells;

Fig. 14 shows a modification of the differential arrangement;

Fig. 15 shows a modification which permits of employing a single tube for both of the cells;

Fig. 16 shows another modification including the use of a thermionic tube with two grids;

Fig. 17 is a sectional view of a device for carrying and controlling the tool carriers;

Fig. 18 is a front view corresponding to said Fig. 17;

Figs. 19 and 20 are a sectional view and an elevational view, respectively, of another embodiment of the device;

Fig. 21 is a view analogous to Fig. 20, the tools being folded up;

Fig. 22 is an elevational view of a machine according to the invention provided with tools carried by an endless chain;

Fig. 23 is an elevational view of the chain, shown on an enlarged scale;

Fig. 24 diagrammatically shows the bands of ground worked upon by the tools;

Fig. 25 is a side view showing on an enlarged scale the detail of the structure of the chain;

Fig. 26 is a similar view at right angles to Fig. 25.

The machine shown by Figs. 1 to 7 is made as follows:

It includes a frame comprising, for instance, two longitudinal members 1 of sectional iron connected together by cross members 1a. This frame is carried by wheels 2. It is provided at the front with shafts 3 and at the rear by an arm 3a provided with a handle 3b for the guiding of the machine when it is being moved in a field, in the same manner as for other agricultural machines, for instance ploughs. At the rear of the machine are also provided the tools 4 intended to act on the earth, consisting, in the example, of three rotary cutters. The spindle 4a of each of these cutters is journaled in a bearing 4b supported by an arm 4c itself fixed on the casing of an electric motor 5 which serves to drive the rotary cutters 4 through pulleys 6 and 6' and belts 6a. Each of the systems constituted by a cutter 4, its supporting arm 4c and the casing of the corresponding electric motor, is mounted in such manner as to be capable of pivoting about a horizontal axis 7. Each of these axes or spindles is supported by flanges or cheeks 7a themselves fixed to the frame of the machine by means of L-shaped metallic pieces 7b. Under the action of gravity, each of these systems, when pivoting about its axis 7, assumes the position shown by Figs. 1 and 2, for which tools 4 act on the earth in a continuous manner when they are driven by their motor 5. Each of these systems can also be raised by pivoting about said spindle 7, under the effect of the attraction of an electro-magnet 8, fixed on the frame of the machine and acting upon the carcass of motor 5, which constitutes the armature of said electro-magnet. When one of these systems is thus attracted by an electro-magnet, the corresponding tool is kept away from the ground in such manner that the plants above which this tool is passing at this time are not touched by said tool.

A short distance ahead of each of said tools, in the direction in which the machine is moving, there is provided, in a case 9, a photo-electric cell which serves to control the automatic raising of the corresponding tool by pivoting about spindle 7, as it will be hereinafter explained. This case 9 may include on the one hand a box 35a containing the photo-electric cell 35 and extending toward the ground through a cone 36 open at its lower part, and, on the other hand, a second cone 37, slightly oblique, joined to cone 36 and leading to a box 38 which contains a light source 38a. The rays from this source are projected on the ground or on the plants through cone 37 and the radiations emitted by the ground or by the illuminated plants are sent toward the cell through cone 36. Ahead of the cell, we provide a filter or screen 39, suitably coloured in such manner as to intercept the radiations coming from the ground and to allow those emitted by the plants to pass on. Of course, the colour of the filters depends upon the nature of the plants which are to be kept and above which the tools 4 are to be automatically raised. In the case of beetroots, we will use, for instance, a blue screen (quinolein blue seems to be well adapted for this purpose) which will stop radiations coming from the ground, and in particular yellow radiations, but will permit blue rays emitted by the chlorophyll of the beetroot leaves to pass on.

The wheels 2 of the machine drive, by means of chain transmissions 10 and 10', a rotary switch 11 the detail of which is illustrated by Figs. 3 and 4. This switch includes a hollow cylinder 12 mounted upon a shaft 12a that is adapted to turn in bearings 12b carried by the frame of the machine. On this cylinder which is rotated by transmission, are mounted loose annular elements 13, the number of which corresponds to the number of tools. Each of these annular elements 13 is provided externally with radial blades 14 which project therefrom in an adjustable manner, owing to the provision of threaded rods 15 rigid with said blades and which can be screwed or unscrewed at will.

Opposite each of these pieces 13, there is provided, on the inside of the hollow cylinder 12, an electro-magnet 16 carried by a carcass 16a which is rigid with the hollow cylinder. The armature 17 of this electro-magnet, which can pivot about an axis 17a carried by carcass 16a acts, when it is attracted by electro-magnet 16, upon a rod 18 which extends through the cylinder and the end of which cooperates with notches 19 provided on the inside of an annular groove 19a formed in the inner surface of the corresponding annular member 13. Notches 19 have, between them, angular intervals equal to those of blades 14.

When electro-magnet 16 is not energized, rod 18 is moved toward the inside of cylinder 12 by a return spring 20 and it is then disengaged from notches 19 in such manner that annular element 13 is not driven by hollow cylinder 12. If, on the contrary, electro-magnet 16 happens to be energized, it attracts its armature 17 and rod 18 comes to project on the outside of hollow cylinder 12. It engages into one of the notches 19 provided in the bottom of the annular groove 19a of annular element 13, so that this element is caused to rotate together with cylinder 12. In the rotation of the annular element, blades 14 come to act upon a switch fixed to the frame of the machine (one switch for each annular element) which is diagrammatically shown at 21 in Figs. 3 and 5. This switch is thus closed when each of the blades passes. It is necessary that, when the drive of each of these annular elements 13 ceases, when the corresponding electro-magnet 16 is no longer energized, one of the blades of this annular element should be stopped on switch 21 so as to keep it closed. For this purpose, we associate with each annular element a spring 22 (Figs. 3 and 5) which is curved in such manner as to engage between two successive blades 14 of the annular element or between teeth carried by said annular element and distributed in the same manner as these blades.

A pawl 23 is pivoted to the frame of the machine and associated with teeth 24 provided on each of the annular elements, so as to permit of their rotating only in the desired direction (arrow f of Fig. 3.)

The current fed by each of the cells, when it receives light when passing above a plant which emits radiations passing through the coloured screen 39, is amplified by an amplifier 25 (see Fig. 5) fixed on the frame of the machine. On this frame is also mounted an electric switch provided with two pairs of metallic blades 26—27 adapted to move along fixed contact studs 26a—27a, electrically insulated from one another but mechanically connected together by a rod 26b or the like. These movable blades can also occupy three positions I, II, III, respectively shown in solid lines and in dotted lines by Fig. 5. In series with the switch 21 controlled by blades 14, there is connected a second switch 16b which closes under the action of a relay 16a when this relay is energized. The circuit also includes a source of current 26c for energizing the lifting electro-magnet 8 and another source 26d (which can be the same as 26c) for the energizing of relay 16a. Of course, we have shown only on Fig. 5 the connections corresponding to one of the electro-magnets 8, to the cell and to the annular element 13 that corresponds therewith. It goes without saying that we may provide as many similar circuits as there are electro-magnets 8, i. e. tools 4 to be raised. However, these various circuits may include a common source of current.

We will now describe the operation of the machine:

1. Let us suppose first that it is desired to break or hoe the ground between the shoots of a planting such as that shown by Fig. 8. The machine is moved in such manner that the three tools, with their cells ahead of them, move respectively along three lines of adjacent shoots, $a_1, a'_1, a_2, a'_2, a_3, a'_3$.

The rotary switches associated with the respective lifting electro-magnets 8 are placed out of the circuit by the reverser switches 26 and 27 when the latter are in their positions I shown in dotted lines. Every time one of the photoelectric cells, passing above a plant $a$, is energized by the radiations emitted by the leaves of this plant, and current is fed to the amplifier 25. This current received by the lifting electro-magnet of the tool which corresponds to the energized cell, causes said tool to pivot upwardly and the tool can thus pass above the plant without injuring it. After which it drops back and again acts upon the ground, as soon as the cell has moved past the plant.

2. We will now examine the application of the machine to the thinning of a bed.

a. If the planting is regular, the action of the photo-electric cell is not necessary. It is then possible to bring it out of the circuit and to make use exclusively of the rotary switches 11 for controlling the lifting electro-magnets (the movable blades of reverser switches 26 and 27 occupying, in this case, position II). Of course, it is necessary that the intervals between the impulses, produced by contactors 21, should correspond to the interval between the plants located along a given line, which can easily be obtained by adjusting the ratio of transmissions 10 and 10'. It is also necessary to key annular elements 13 on cylinder 12, for instance by permanently energizing electro-magnets 16, by means of a source of current 26c, inserted into the circuit by means of reverser switch 26.

b. However, the action of the photo-electric cell is preferable because it automatically corrects lack of regularity as might exist in the intervals between the plants, or the differences which might result from unevenness of the ground along the path of the wheels of the machine.

We may make use of the cell for aligning a field on the lines of an adjoining field already treated or on marks or sticks planted in the ground and suitably distributed on one side of the field to be worked upon. In this case, use will be made of a single cell controlling the whole of the lifting electro-magnets of the various tools.

The switches 26—27 corresponding to the various lifting electro-magnets will be placed in position I. The single cell will be connected to the input end of an amplifier 25 the output side of which is connected in shunt with those of the terminals 26a which correspond to position I of the lifting electro-magnets. The cell contained in a casing 9 made as above described with reference to Fig. 7, will be placed on one side of the machine, as shown in dot-and-dash lines in Fig. 2, in such manner that it follows the outline $b_1—b'_1$ of a field already treated (Fig. 9). In this way, the tools, which will move respectively along lines $a_1—a'_1, a_2—a'_2, a_3—a'_3$, will leave only the plants $b$ in these lines which are at the same interval as those left in lines $b_1—b'_1$, or existing between these marks or sticks.

In Fig. 2, we have shown in dotted lines two cells laterally mounted. According as the line $b_1—b'_1$ (Fig. 9) on which the lateral marking is based is located on the left or on the right hand side of the machine, one or the other of these cells is connected to the input terminals of the amplifier.

In view of the regularity obtained with the machine according to our invention, it is possible to hoe the plantation subsequently, with ordinary hoeing machines, lengthwise and cross wise, a thing which, up to now, was not possible.

c. If it is desired to work a plantation in such manner that the plants remaining after the passage of the machine are arranged in staggered relation (case of a field which is longer than it is wide), it is necessary that the liftings of the various tools should be suitably spaced in the time. For this purpose, if the control of the lifting is made by the rotary switches 21 (case $a$ above considered) it would be possible to suitably adjust the relative positions of said switches or again of the tools. If the lifting of the various electro-magnets is controlled by a single cell, according to what has been above described at $b$, it is possible also to modify in relatively different ways the lifting of the various tools by controlling this lifting through the intermediate of rotary switches of the kind of those used in automatic telephony.

Fig. 6 shows an arrangement of this kind.

The electro-magnet 28 of this switch is mounted between points $p$ and $q$ of the diagram of Fig. 5, in such manner that the current impulses sent, either by the photo-electric cell or by the rotary switch 11, operate said electro-magnet 28, which displaces the rotary cursor 29. The latter controls, through contact pieces 30 and the movable grid 31, the lifting electro-magnet 8. It will be readily understood that, by associating such a switch with each of the lifting electro-magnets, associated with the respective tools, and by angularly adjusting the position of the grids 31 of these switches in a suitable manner, it is possible to produce the energizing of the electro-magnets 8 at suitable intervals, determined by a single impulse emitted by the photo-electric cell or by simultaneous impulses produced by the contactors.

d. Finally, in the case of the thinning of an irregular plantation, each tool is controlled independently of the others by a photo-electric cell, according to the direction in which both are moving, and by the corresponding rotary switch.

Reverser switches 26 and 27 will occupy position III shown in solid lines.

The operation will be readily understood from the following explanations:

Let us suppose that $c_1, c'_1$ is the line along which a photo-electric cell and the tool associated therewith are moving (Fig. 10). At point $d$, for instance, the cell comes upon the origin of an uninterrupted line of plants and it feeds current to amplifier 25, which in turn supplies current to the electro-magnet 16 of the rotary switch and to relay 16a. Annular element 13 is then driven and its blades successively open and close contact 21. The duration of each closing depends upon the adjustment of the radial position of the blades with respect to the annular element. Every time the contact 21 is closed, electro-magnet 8 is energized and it lifts the cutter. The latter therefore removes plants at regular intervals along line $d—e$.

At $e$, at the end of the line of plants, the cell ceases supplying current. The electro-magnets 16 and 16a are then de-energized. The annular element 13 is not driven, and consequently, the tool works the ground in a continuous manner.

If there exists at f a single plant, the photoelectric cell again sends current into electro-magnets 16 and 16a. The annular element is driven. Electro-magnet 8 is immediately energized and moves the tool upwardly so that it passes above the plant without injuring it.

The current necessary for the feed of the various apparatus can be supplied by a small electric generator 40 (Fig. 1) mounted on the frame of the machine and driven by an explosion engine 40a, also carried by the machine.

We will now describe a device in which to each lifting electro-magnet 8, there is associated not one cell as in the above examples, but two photoelectric cells working differentially.

As in the embodiment shown by Fig. 12, the control device includes two photo-electric cells x and y, each associated with a semi-reflecting glass 40, in such manner that each of the photoelectric cells receives a portion of the light beam emitted by the ground or by any object located on the ground, the light beam being preferably concentrated upon each of the photo-electric cells by a lens or a system of lenses 41. Furthermore, in front of each of the photo-electric cells, there is provided a selector filter 39', 39a, constituted in such manner that one of them, 39' for instance, allows only light the wave length of which in green or blue corresponds to that of the plant to be chosen to pass, whereas the other one 39a allows the whole of the spectrum to pass with the exception of the rays which are allowed to pass by the first screen.

For instance, for the detection of beet-roots, we may make use of a filter 39' which is colored with methyl green while filter 39a is colored with Rhodamine B.

If we trace the curves showing the luminous intensity passing through the filters as a function of the wave-lengths, we obtain, for instance, for the two filters, the respective curves 39b and 39b' which are shown by Fig. 11.

Each of the cells may be connected (Fig. 13) to the grid 42, 42a of a thermionic tube 43, 43a, working in the zone corresponding to the bottom of its characteristic curve, in such manner that the cell produces, when it is illuminated, the flow of filament-plate current through the corresponding tube, this current stopping, however, as soon as the cell is in darkness. At this time, each of the grids 42, 42a receives, in the known manner, a negative polarity of suitable value from the common source 44 through the intermediate of resistances 44', 44'a. When the cells no longer receive light, their resistance is extremely high and the grid potential of tubes 43, 43a is fixed by resistances 44', 44'a, which are chosen in such manner that this polarization potential is sufficiently negative for keeping the plate circuit current to a very low value.

When one of the cells is illuminated, its apparent resistance decreases very much and it becomes of a value corresponding to that of the corresponding resistance 44', 44'a. The grid potential of the tube associated with the illuminated cell becomes less negative and it can even become zero or positive, in such manner that the plate current of the tube increases.

In the arrangement shown by Fig. 13, the plate circuit of each of the tubes includes a resistance 45 or 45a across which the current, produced when the cell is energized, determines a certain drop of potential. The ends 45', 45'a of these resistances are connected respectively to filament 52a and to grid 52b, belonging to a thermionic tube 52 the plate circuit of which includes the winding 46 of a relay. The armature 47 of this relay controls the circuit of the lifting magnets which move the tools away from the plants, or again the rotary switch, driven by the wheels of the machine, according to which application of said machine is considered, as above explained.

When none of the photo-electric cells is illuminated, points 45', 45'a are kept at the same potential by battery 44. However, grid 52b is negatively polarized in comparison with the filament 52a by means of battery 53, in such manner that no current flows through relay 46.

The operation of this system takes place in the following manner:

*First case.*—The system of photo-electric cells passes above the plant to be chosen (for instance a beet-root).

As a consequence of the nature of the filters, only cell x receives light and consequently only tube 43 the grid of which is connected to said cell supplies current to its plate circuit.

Consequently, the potential of point 45' decreases with respect to that of point 45'a. Therefore grid 52b becomes less negative, or even positive with respect to filament 52a, and current flows through the anode circuit of tube 52, whereby relay 46 attracts its armature 47. The tools are then lifted either directly, or through the rotary switch operated by the wheels of the machine.

*Second case.*—The cells pass above a white or polished (reflecting) object.

The two cells are then simultaneously illuminated. Their plate circuits supply current. The potential at points 45' and 45'a varies in the same direction. Grid 52b remains negative with respect to filament 52a and relay 46 is not energized.

If, finally, the apparatus passes above an object emitting rays which are complementary of those emitted by the object to be chosen, and if, consequently, cell y is energized, the potential of point 45'a decreases with respect to that of point 45'. The consequence of this is to render grid 52b still more negative and no current flows through the circuit of relay 46.

With this arrangement of the photo-electric cells it is advantageous to make and dispose glass 40 in such manner that the light flux it allows to pass by transparency is substantially equal to that it reflects, and that substantially equal amounts of light energy are directed toward selecting filters 39', 39a.

In the arrangement illustrated by Fig. 14, there are two relays 47' and 47'a, respectively inserted in the plate circuits of two tubes 43', 43'a. Their contacts 48, 48a are inserted in series in the control circuit of the lifting electro-magnets, or preferably in a circuit including a source of current 51 and a third relay 49 the contactor 50 of which controls the circuit of the lifting electro-magnets. These relays 47' and 47'a are such that one, for instance relay 47', closes its contact only when it is energized, while, on the contrary, the other, to wit 47'a, opens its contact when it is energized. Consequently, it will be readily understood that the control circuit is closed only if relay 47 is the only one to be energized (passage of the cells above the plant to be chosen) whereas the simultaneous energizing of relays 47' and 47'a (passage over a white or polished object) or the energizing of only relay 47'a (passage above an object the emission of which includes only rays different from the rays characterizing the object to be chosen) cannot produce the closing of the control circuit, that is to say the energizing of relay 49.

The semi-reflecting glass advantageously consists of a plane mirror the silvering of which has been removed along successive narrow strips (from 1.5 mms. to 2 mms.) alternating with strips along which the silvering has been preserved. This glass is a semi-reflecting one and its advantage is that there is practically no effect of filtration of color for the light beam which passes therethrough.

In the differential arrangement shown by Fig. 15, the cells are connected to the same electron tube 54, in the output circuit of which relay 46 is inserted. It will be readily understood that, when cell $x$ is energized by the rays emitted by an object or a plant to be chosen, the current of source 44 which flows through said cell and resistance 45b has for its effect to render the grid 55 of tube 54 less negative with respect to the filament, whereby the current of battery 53, flowing through the filament-plate space of tube 54, supplies current to relay 46, which attracts its armature 47. If cell $y$ is the only one to be energized, grid 55 becomes more negative and consequently no current flows through relay 46. If, finally both of the photo-electric cells are simultaneously energized, they feed opposed currents through resistance 45b and the potential of grid 55 does not vary. Of course, one or several amplifying electron tubes can be inserted between tube 54 and relay 46.

In the arrangement of Fig. 16, the photo-electric cells are mounted in opposition and respectively connected to the two respective grids 55', 55a of a two-grid tube 54'.

The operation of such an arrangement will be readily understood. In the state of rest, both grids 55' and 55a are at the same potential as the filament and the tube has but a low output, which is not sufficient for producing the attraction of armature 47 by relay 46. If cell $x$ is energized by a plant or an object to be chosen, current flows therethrough, and as a consequence of the presence of resistance 44b, grid 55' again becomes positive with respect to cathode 55b. The output in the plate circuit of the tube increases and relay 46 attracts its armature.

If only cell $y$ receives light, the presence of resistance 44'b has for its effect to render grid 55a negative with respect to the cathode 55b. The electrons no longer reach the plate and relay 46 is not energized.

If, finally, both of the photo-electric cells $x$ and $y$ are simultaneously energized, they supply opposed currents and the relay is not energized because, if grid 55' becomes positive, grid 55a becomes negative, and thus prevents the emission of electrons.

Of course, these arrangements are not the only possible ones and there might be changes made without departing from the principle of the invention, for instance by making use of the various tubes which are now available.

On the other hand, if use is made of photo-electric apparatus sufficiently powerful for supplying currents capable of acting on a relay without amplification (such for instance as Zworykin tubes), the thermionic tubes can be dispensed with.

Of course, the embodiments above described have been given merely by way of example.

The electric circuits illustrated in the figures just above described show sources of current constituted by batteries. It is also possible to make use of a single alternating source associated with a transformer supplying the tensions required for the various circuits. It is possible to dispense with the rectification of the current, the thermionic tubes acting as current rectifiers, unless the frequency of operation of the relays is of the same order of magnitude as the frequency of the source of alternating current. In this case, it is necessary to make use of continuous tensions suitably filtered.

Concerning the mechanical part of the apparatus, it seems advantageous to make use of one of the arrangements which will be hereinafter described.

In the embodiment of Figs. 17 and 18, the tool carrier or the rotary tool 4' (in the example illustrated by the drawings, this tool is constituted by a toothed disc forming a kind of rotary cutter) is driven by the driving shaft 5a through the intermediate of friction plates 78. When a plant is in the path of the tool and therefore energizes the photo-electric cell, electro-magnet 8' causes the downward movement of a pawl 62 which comes across the path of a tooth 63 provided on the plate 78 which is rigid with the tool carrier. The tool carrier is thus stopped, in such manner that a notch 70, provided in the periphery therein, and of a size sufficient for permitting the passage of a plant without injuring it, is turned toward the ground.

When electro-magnet 8' is de-energized, a spring moves the pawl upwardly and cutter 4' again starts rotating on the ground.

In the embodiment of Figs. 19, 20 and 21, the tools 4 are pivotally mounted about spindles 79 carried by a plate 80 which is continuously rotated by the driving shaft 5a. Around this shaft, there is provided a sleeve 81 which carries, on the one hand, a pulley 82 adapted to be braked by shoes 83, and, on the other hand, a ratchet wheel 84 against which pawls 85 are bearing. These pawls are pivoted on arms 86 carried by the respective tools. Springs 87, fixed to plate 80 and bearing upon arms 86, tend to maintain the tools in their working position shown by Fig. 20, in which position they can be fixed by abutments 88 provided on the plate.

It will be readily understood that, as long as pulley 82 is not braked, sleeve 81 is driven by pawls 85 and ratchet wheel 84, the tools being maintained in working position by springs 87. As soon as the electromagnets 8a are energized, as a consequence of the passing of the photo-electric cell or cells on a plant, shoes 83 come to brake pulley 82 and ratchet wheel 84 exerts a certain resistance on pawls 85. The latter then cause arms 86 to pivot and the tools are moved out of the way as shown by Fig. 21.

We will now describe, with reference to Figs. 22 to 26, another embodiment in which the tools are carried by the links of an endless chain.

As shown by Figs. 22 and 23, this chain 90 extends vertically at the rear of the machine and it passes on two wheels 91 and 92 one of which, to wit 91, for instance, is driven by the wheels 2 of the machine, through a transmission which may include a chain 94, gears 95, and a shaft 96 eventually provided, if necessary, with a universal joint 97.

The chain shown by the drawings is made of steel wire forming the links. It might also be constituted by links of cut metal sheets, or, in a general manner, it might be made in any suitable way.

The whole of these two wheels is mounted on a metal frame 98 on which are fixed the two bearings 99 and 100 of the wheels, one of these bearings 99 being mounted rigidly and the other, 100, being adapted to slide vertically. This last mentioned bearing is pushed upwardly by a strong spring 101 the pressure of which is adjustable by means of screw 102 which screws in block 103 rigid with the frame. This screw bears upon the cup-shaped member 104 on which spring 101 bears. A stop 105 prevents bearing 100 from leaving the frame in case of accidental breaking of the chain thus tensioned.

Under normal working conditions (hoeing or breaking of the ground) tools 106 are kept at right angles to the chain by springs 107 (Fig. 26). The work on the ground is continuous, the successive tools tracing, when they are working, juxtaposed successive strips such as $aa$, $bb$, $cc$, $dd$, $ee$ (Fig. 24). The juxtaposition of these strips is regular if the quotient of the velocity of movement of the machine, $Vm$, and of the width of work, $l$, performed by a tool is equal to the quotient of the length of chain passing past a point per unit of time (that is to say the linear velocity of the chain, $Vc$) and of the pitch of the chain (that is to say the distance P between two successive tools), which corresponds to the following formula:

$$\frac{Vm}{l} = \frac{Vc}{P}$$

For instance, for working beetroot plantations or other plants which are cultivated in a similar manner, the following values have been found to be convenient:

$Vm$ _____ 100 centimeters per second
$l$ _____ 2 centimeters
$Vc$ _____ 250 centimeters per second
$P$ _____ 5 cms. (50 tools)

If velocity $Vc$ increases ($Vm$ remaining constant) strips $aa$, $bb$, $cc$, $dd$, $ee$, will overlap one another, which may be very advantageous in some grounds and for certain types of work.

If $Vc$ decreases ($Vm$ remaining constant) strips $aa$, $bb$, $cc$, $dd$, $ee$ will be separated from one another by strips on which no work has been done, of a width inversely proportional to $Vc$.

The resultant R of vectors $Vm$ and $Vc$ gives the inclination of the strips of ground with respect to the direction of travel (angle $\alpha$). This inclination can easily be modified in case of need, for instance in order to render it equal to zero, by inclining the vertical plane of wheels 91 and 92 and of the chain with respect to the direction of travel of the machine. For this purpose, the frame 98 which supports the endless chain will be arranged to be movable about a vertical axis, which will be possible if the center of the universal coupling is located on said axis.

This arrangement of a chain movable about a vertical axis also has the advantage of permitting of juxtaposing on the same machine 2, 3, 4, 5 or more chain in order to work on 2, 3, 4, 5 or more rows of plants simultaneously, these rows being possibly very close to one another (for instance 30 cms.).

If one tool is retracted, as shown at 106', the band that should have been worked by said tool remains unchanged (strip $f$ in the case of Fig. 24).

If two successive tools are retracted, a strip of ground such as $g$ is left unchanged. If three successive tools are retracted, a strip of ground such as $h$ is left unchanged, and so on.

The hoeing and thinning of any plantations in which the plants are arranged in lines is thus possible, whatever be the interval between successive plants and the length occupied by each plant or group of plants in each line.

In the case of the chain shown by way of example the length of each tool is greater than the distance between two successive tools. Consequently, in order to permit of retracting a tool by swinging it into the plane of the chain it is necessary to arrange its axis of pivoting in such manner that the retracted tool comes to be brought on the side of the preceding one. For this reason, the elements of the device are arranged in the following manner: The chain axes (about which the links are pivoted to one another) 108 are at equal distances from one anothe rand parallel to one another, and the axes about which the tools are pivoted, to wit axes 109, are inclined alternately in one direction and in the other with respect to the median plane of the chain. Each tool is mounted on such an axis and at right angles thereto.

It follows that each tool, when extending at right angles to the chain (such as 106 in Fig. 26) is located in the longitudinal median plane of the chain, whereas said tool, when swung down in an oblique plane is brought, when retracted, that is to say applied against the links of the chain, on the side of the tool located ahead of it, now on the left thereof now on the right according to which tool is being considered.

Fig. 26 shows, starting from the top thereof, two tools which are retracted, to wit 106' and 106'', then a tool extending in the working position, to wit 106. Abutments 107a, provided on the tools prevent them from being forced backward when working the ground. At 106a, we have also shown, at the bottom of Fig. 26, a tool of the removable type (with the spring omitted) in the retracted position. As a matter of fact, it may be useful to be able to modify the shape or length of the tools according to the work to be performed, or to be able to sharpen or subject to a termic treatment the points of said tools, which is possible if use is made of removable tools.

Such a removable tool is advantageously fixed on its spindle by two metal sleeve elements such as 106b, held by means of a bolt 106c.

When it is desired to work on rows of groups of plants located at large intervals from one another, each group of plants being of a considerable length in the direction of the row, which is for instance the case for cotton, it is possible considerably to increase the width over which each tool is working. The formula above stated shows that, in this case it would be necessary to increase P in order to comply with said formula. If $l$ and P are sufficiently large (and in particular if the length of a tool becomes smaller than the distance between two links of the chain), said chain might be greatly simplified since the tools could be retracted behind one another without interfering with one another. In such a case, the spindles about which the tools are pivoted would be parallel to the spindles of the chain, without any other difference with the example above described.

The automatic retracting of a tool during the movement of the endless chain is ensured in the following manner:

Each tool carrying spindle is provided at one of its ends with a crank 110. An electro-magnet 86, operated under the control of the photo-electric cells (in the case of an automatic machine) is secured to the frame 98 of the machine by means of a metal support 98a in such manner that its armature 111 (or a member rigid therewith) can come across the path of travel of cranks 110 when the electro-magnet has been energized by the photo-electric cell for the purpose of leaving a plant or group of plants undisturbed, that is to say when it is necessary to retract one or more tools. The crank 110 of the tool which comes opposite the armature of the electro-magnet, when the latter is operated, is engaged by said armature (see Fig. 26) so that said crank, and its tool, are caused to swing down against the chain. The external end of said crank is thus caused to bear against a rail 112 fixed to the frame of the machine by means of brackets 113, and said rail will keep said crank in this position until it is no longer necessary to do so, that is to say until after the machine has moved past the plant or group of plants to be left undisturbed. This is the case for the cranks marked 110' in Figs. 23, 25 and 26, whereas the crank shown at 110 (Fig. 26) has not co-operated with the electro-magnet and remains guided by the opposite side of the rail. In Fig. 23, crank 110'' is shown as it leaves the guide rail. It is brought back into its normal position by the return spring 107.

It will be noted that the armature 111 of the electro-magnet carries an auxiliary projection 111a located ahead of 111 along the path of the cranks. This projection is intended to cause the crank of the tool located behind the tool to be retracted to oscillate temporarily so as to prevent it from being engaged by the crank of the tool to be retracted in the course of the pivoting movement thereof. This auxiliary projection 111a would be unnecessary in the case of a chain having its tools pivoted about parallel axes or if the cranks were shorter, these details depending upon the particular construction of the device.

All the cranks which are not switched on the outer face of the guide rail, that is to say all the cranks which pass while the projection 111 of the electro-magnet is not driven out, keep moving along the inner face of the rail. This case is shown at 110 for instance in Figs. 25 and 26.

Of course the position of the electro-magnet (or of any other device controlling the position of member 111) is variable according to the distance along which a point of the chain must move between the electro-magnet and the vertical line passing through the point of the ground which is to be left undisturbed. Besides, this distance corresponds to the time elapsing between the retracting of a tool and its passage on said vertical line. This time is also equal to that elapsing between the time when the plant to be left undisturbed is seen by the photo-electric cell and the time when the plane of work of the tools comes above said plant.

The guide rail must be located close enough to the armature of the electro-magnet, in such manner that once a crank of a tool has been engaged by said armature it cannot switch back to the opposite side of the rail but is kept engaged on the outer side thereof The movement of abutment 111—111a which produces the retracting of the tools of the chain can be produced mechanically, hydraulically or pneumatically.

Of course, is is clear that, according to our invention, each control impulse, instead of producing the retracting of a tool, might quite as well bring into operative position a tool which is normally retracted.

Instead of being controlled by the production of a current across the photo-electric cell or cells, the lifting or retraction of the tools might quite as well be produced by the cutting off of the current of the cell, which would imply the use of inverse filters, allowing the rays from the ground to pass therethrough but stopping those emitted by the plants.

As for the applications above stated, they have no limitative character.

The control device by means of photo-electric cells can be utilized on various machines, for instance machines for automatically tearing off plants or roots, drilling machines, apparatus for trimming plants or roots of all kinds (especially cotton), for selecting or parting plants, fruits, leaves, grains, and so on, and, in a general manner any other type of machine intended to perform periodically an operation the period of which is determined by the presence of objects of a determined color with respect to that of the ground upon which they are located In the case of drilling machines, machines for keeping plantations in good order and harvesting machines, it is possible to subject the photo-electric cell to the action of rays emitted by pegs or other marking members, distributed at the desired intervals along the path of travel of the photo-electric cell.

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the accompanying claims.

What we claim is:

1. A machine of the type described, which comprises, in combination, a frame movable above the ground, at least one tool carried and adapted to be controlled so as to act on the ground, and photo-electric means, responsive to the luminous action of objects on the ground for controlling said tool.

2. A machine of the type described, which comprises in combination, a frame movable above the ground, at least one tool movably carried by said machine on said frame in such manner as to act normally on the ground, at least one photo-electric cell carried by said frame ahead of the path of travel of said tool, responsive to the luminous action of objects on the ground below it, and means operative by said photo-electric cell for moving said tool out of contact with said ground when said photo-electric cell has been influenced by a predetermined object on the ground below it 3. A machine of the type described, which comprises, in combination, a frame movable above the ground, at least one tool movably carried on said machine so as to act normally on the ground, means for operating said tool carried by said machine, at least one photo-electric cell carried by said frame along the path of travel of said tool ahead thereof, said photo-electric cell being arranged to be responsive to variations of the luminous action from the part of the ground, with the objects eventually present thereon, located below it, an electro-magnet for moving said tool out of contact with the ground arranged to be energized when said photo-electric cell has been influenced by a predetermined object on the ground below it.

4. A machine of the type described, which comprises, in combination, a frame movable above the ground, at least one tool movably carried by said frame so as to act normally on the ground, means for operating said tool carried by said frame, at least one photo-electric cell carried by said frame along the path of travel of said tool ahead thereof, said photo-electric cell being adapted to work in response to variations of the luminous action from the part of the ground, with the objects eventually present thereon, located underneath it, an electro-magnet for moving said tool out of contact with the ground when energized, and means for energizing said electro-magnet operative by said photo-electric cell when the latter has been influenced by a predetermined object on the ground below it, a rotary contactor operative by the movement of said frame along the ground for periodically energizing said electro-magnet, and switch means for connecting with said electro-magnet either said means operative by the photo-electric cell or said rotary contactors, or again both simultaneously.

5. A machine of the type described, which comprises, in combination, a frame movable above the ground, a plurality of tools movably carried by said frame so as to act normally on the ground, said tools being disposed on a line transverse to the direction of movement of said machine, means for operating said tools carried by said frame, at least one photo-electric cell carried by said frame ahead of said tools and adapted to work in response to variations of the luminous action from the part of the ground, with the objects eventually present thereon, located underneath it, an electro-magnet for moving each of said tools out of contact with the ground when energized, and means for operating said electro-magnets controlled by said photo-electric cell with a time delay which is not the same for all of said electro-magnets, whereby said tools are not all retracted simultaneously for bringing them out of operation on the ground, for a given energizing of said cell.

6. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof, one of said cells being adapted to work in response to rays emitted by a predetermined kind of objects lying on the ground and the other being adapted to work in response to all other rays, said photo-electric cells being arranged to be subjected to the luminous action from the part of the ground, with the objects eventually present thereon, located below them, an electro-magnet adapted to move said tool out of contact with the ground when energized, and means differentially operative by said photo-electric cells for energizing said electro-magnet when said photo-electric cells pass above an object of the kind above mentioned.

7. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof so as to be subjected to the luminous action from the part of the ground, with the objects eventually present thereon, located underneath them, a selecting filter interposed between each of said photo-electric cells and the ground, one of said filters being adapted to permit the passage of light rays characterizing a category of objects and the other being adapted to permit the passage of all other light rays, an electro-magnet adapted to move said tool out of contact with the ground when energized, and means differentially operative by said photo-electric cells for energizing said electro-magnet when both of said photo-electric cells pass above an object of the category above mentioned.

8. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof so as to be subjected to the luminous action from the part of the ground, with the objects eventually present thereon, located underneath them, one of said cells being adapted to work in response to rays emitted by a predetermined kind of objects and the other being adapted to work in response to all other light rays, a semi-reflecting glass element interposed between the ground and said photo-electric cells in such manner as to direct a part of the light rays from the ground onto one of said cells and the remainder of said rays onto the other cell, said glass element being carried by said frame, an electro-magnet adapted to move said tool out of contact with the ground when energized, and means differentially operative by said photo-electric cells for energizing said electro-magnet when said photo-electric cells pass above an object of the kind above mentioned.

9. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof so as to be subjected to the luminous action from the part of the ground, with the objects eventually present thereon, located underneath them, one of said cells being adapted to work in response to rays emitted by a predetermined kind of objects and the other being adapted to work in response to all other light rays, an electro-magnet adapted to move said tool out of contact with the ground when energized, a circuit for energizing said electro-magnet, a thermionic tube associated with each of said photo-electric cells, means for polarizing said tubes in such manner as to limit the current in the plate circuits thereof to a low value when the respective cells are not energized and to cause current to flow through the plate circuit of a tube when the photo-electric cell associated therewith is energized by light rays, and a relay differentially operative by the plate circuits of said tubes for closing the electro-magnet circuit when the photo-electric cell operative by the light rays emitted by said predetermined kind of objects is illuminated by said rays.

10. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof so as to be subjected to the luminous action from the part of the ground, with the objects eventually present thereon, located underneath them, one of said cells being adapted to work in response to rays emitted by a predetermined kind of objects and the other being adapted to work in response to all other light rays, an electro-magnet adapted to move said tool out of contact with the ground when energized, a circuit for energizing said electro-magnet, a thermionic tube associated with each of said photo-electric cells, means for polarizing said tubes in such manner as to limit the current in the respective plate circuits thereof to a low value when the respective cells are not energized and to cause current to flow through the plate circuit of a tube when the photo-electric cell associated therewith is energized by light rays, another thermionic tube, means for polarizing the grid of the last mentioned tube influenced by the currents in the plate circuits of the first mentioned tubes, and a relay in the plate circuit of the third mentioned thermionic tube for closing said electro-magnet circuit when the photo-electric cell operative by the light rays emitted by said predetermined kind of objects is illuminated by said rays.

11. A machine of the type described, which comprises, in combination, a frame movable above the ground, at least one tool movably carried by said frame so as to act normally on the ground, means for operating said tool carried by said frame, two photo-electric cells carried by said frame along the path of travel of said tool and ahead thereof so as to be subjected to the luminous action of the part of the ground, with the objects eventually present thereon, located underneath them, one of said cells being adapted to work in response to light rays emitted by a predetermined kind of objects, and the other being adapted to work in response to light rays of all other wave. lengths, an electro-magnet adapted to move said tool out of contact with the ground when energized, a circuit for energizing said electro-magnet, a thermionic tube associated with each of said photo-electric cells, respectively, means for polarizing said tubes in such manner as to limit the current in respective plate circuits thereof to a low value when the respective cells are not energized and to cause current to flow through the plate circuit of a tube when the photo-electric cell associated therewith is energized by light rays, a relay for closing said last mentioned electro-magnet circuit, a circuit for operating said relay, and two contacts in said last mentioned circuit in series therein, respectively controlled by the currents in the plate circuits of said thermionic valves, one of said contacts being normally open and the other normally closed, so as to close said last mentioned relay circuit when the photo-electric cell operative by the light rays emitted by said predetermined kind of objects is illuminated by said light rays.

12. A machine of the type described, which comprises, in combination, a frame movable above the ground, at least one tool movably carried by said frame so as to act normally on the ground, means for operating said tool carried by said frame, two photo-electric cells, including each an anode and a cathode, carried by said frame along the path of travel of said tool and ahead thereof so as to be subjected to the luminous action of the part of the ground, with the objects eventually present thereon, located underneath them, one of said cells being adapted to work in response to light rays emitted by a predetermined kind of objects, and the other being adapted to work in response to all other light rays, an electro-magnet adapted to move said tool out of contact with the ground when energized, a circuit for energizing said electro-magnet, a thermionic tube having its grid connected to the anode of one of said photo-electric cells and to the cathode of the other cell, a battery in series with both of said cells, said tube being further connected to an intermediate point of said battery, and a relay in the plate circuit of said tube for closing said electro-magnet circuit when the photo-electric cell operative by the light rays emitted by said predetermined kind of objects is illuminated by said light rays.

13. A machine of the type described, which comprises, in combination, a frame movable above the ground, at least one tool movably carried by said frame so as to act normally on the ground, means for operating said tool carried by said frame, two photo-electric cells including each an anode and a cathode, carried by said frame along the path of travel of said tool and ahead thereof so as to be subjected to the luminous action of the part of the ground, with the objects eventually present thereon, located underneath them, one of said cells being adapted to work in response to light rays emitted by a predetermined kind of objects, and the other being adapted to work in response to all other light rays, an electro-magnet adapted to move said tool out of contact with the ground when energized, a circuit for energizing said electro-magnet, a thermionic tube having two grids, one of said grids being connected with the anode of one of said cells and the other grid being connected with the cathode of the other cell, a battery in series with both of said cells, said tube being further connected with an intermediate point of said battery, and a relay in the plate circuit of said tube for closing the electro-magnet circuit when the photo-electric cell operative by the light rays emitted by said predetermined kind of objects is illuminated by said light rays.

14. A machine of the type described, which comprises, in combination, a frame movable above the ground, at least one rotary tool journalled in said frame so as to act on the ground by its periphery, said rotary tool being provided with a notch of sufficiently great amplitude for passing over a plant on the ground without disturbing it, means for mechanically locking said rotary tool in the position thereof for which said notch is just above the ground, at least one photoelectric cell carried by said frame along the path of travel of said tool ahead thereof, said photoelectric cell being arranged to be responsive to variations of the luminous action from the portion of the ground, with the objects eventually present thereon, located underneath it, and means operative by said photo-electric cell for bringing said mechanical locking means into action when said cell has been influenced by a predetermined object on the ground.

15. A machine of the type described, which comprises, in combination, a frame movable above the ground, a rotary plate journalled in said frame, means for rotating said plate carried by said frame, a plurality of tools movably carried by said plate so as to normally act on the ground, said tools being retractable so as to move clear of the ground, a sleeve mounted loose coaxially with said plate, adapted to bring said tools into their respective retracted positions when braked, means for braking said sleeve, at least one photo-electric cell carried by said frame along the path of travel of said plate ahead thereof, said photo-electric cell being arranged to be responsive to variations of the luminous action from the portion of the ground, with the objects eventually present thereon, located underneath it, and means, operative by said photo-electric cell, for bringing said braking means into action when said cell has been influenced by a predetermined object on the ground.

16. A machine of the type described, which comprises, in combination, a frame movable above the ground, an endless chain carried by said frame in a vertical plane, means for rotating said chain as said machine is moving on, a plurality of tools carried by said chain at regular intervals, elastically mounted thereon in operative position for acting on the ground when the corresponding part of the chain is moving along the bottom of its path, guiding means located adjacent said bottom part of the chain, arms carried by said tools respectively, adapted to cooperate with said guiding means for keeping said tools out of contact with the ground, in inoperative position, when said arms have been engaged on one side of said guiding means, and an abutment movable across the path of travel of said arms for causing them to engage on said side of said guiding means.

17. A machine of the type described, which comprises, in combination, a frame movable above the ground, an endless chain mounted on said frame in a vertical plane, means operative by the movement of said machine for causing said chain to turn in a synchronous manner, a plurality of tools pivoted to said chain at regular intervals along it, about axes transverse to the direction of movement of said chain, spring means for resiliently keeping said tools substantially at right angles to said chain, so that said tool can act on the ground when the portion of the chain that carries them is moving along the lower part of the path of said chain, a guiding rail located adjacent said lower part of the chain, cranks carried by said tools respectively adapted to cooperate with said guiding rail for keeping said tools swung in inoperative position in which they cannot act on the ground, and an abutment movably carried by said frame so as to be able to come across the path of said cranks so as to cause them to engage said guiding rail.

18. A machine of the type described, which comprises, in combination, a frame movable above the ground, an endless chain mounted in said frame in a vertical plane, means operative by the displacement of said machine along the ground for causing said chain to turn synchronously with said displacement, a plurality of tools pivoted to said chain at regular intervals along it about axes alternately inclined on either side of the direction at right angles to the movement of said chain, so that when said tools are at right angles to the chain they are located in the median plane thereof, whereas when they are swung down into the plane of said chain they are inclined alternately on one side and the other of said median plane, stop means for preventing said tools from being forced rearwardly beyond this position at right angles by the resistance of the ground, spring means for elastically opposing the forward pivoting of said tools about said axes, whereby each of said tools can act on the ground when the portion of the chain that carries it is moving along the lower portion of its path, a guiding rail located adjacent said lower portion of the path of said chain, cranks carried by said tools adapted to cooperate with said guiding rail for keeping said tools swung forward in the inoperative position, in which they cannot act on the ground once they have been engaged with said guiding rail, and an abutment movable across the path of travel of said cranks, so as to cause them to engage said guiding rail.

19. A machine according to claim 18, further includng an electro-magnet for actuating said movable abutment.

20. A machine according to claim 18 further includng an electro-magnet for actuating said movable abutment, a photo-electric cell carried by said frame ahead of the path of travel of the lower part of said chain, along said path of travel, said photo-electric cell being arranged to be responsive to variations of the luminous action from the portion of the ground, with the objects eventually present thereon, located underneath it, and means operative by said photo-electric cell for operating said electro-magnet when said cell has been influenced by a predetermined object on the ground along said path of travel.

21. A machine of the type described, which comprises, in combination, a frame movable on the ground, an endless chain carried by said frame in a substantially vertical plane, means for turning said chain when said machine is displaced along the ground, tools pivotally supported by said chain at regular intervals so that, by pivoting with respect to said chain, said tools can occupy either of two different positions with respect to the chain, one in which they act on the ground when the chain is moved along its path and the other in which they are kept apart from the ground, and control means carried by said frame along the path of said chain so as to act on said tools for selectively modifying the respective positions thereof.

22. A machine of the type described, which comprises, in combination, a frame movable along the ground, an endless chain carried by said frame in a substantially vertical plane, means for turning said chain when said machine is moving along the ground, tools pivotally mounted on said chain at regular intervals, so that, by pivoting with respect to said chain, said tools can occupy either of two different positions with respect thereto, one in which they act on the ground when the chain is moved along its path, and the other in which they remain apart from the ground, an arm on each of said tools and a movable abutment adapted to cooperate with said arms in the course of the movement of the chain, said abutment being adapted to act on said arms so as to modify the position of the tools, and means for bringing said abutment across the path of said arms when the chain is moving.

23. A machine of the type described, which comprises, in combination, a frame movable above the ground, at least one tool carried by said frame and adapted to be controlled so as to act on the ground, a light source adapted for emitting light rays onto objects lying on the ground and photo-electric means responsive to the action of said objects on said rays for controlling said tool.

24. A machine of the type described, which comprises, in combination, a frame movable on the ground, an endless carrier mounted in said frame and movable in a substantially vertical plane, means for moving said carrier when said frame is displaced along the ground, tools pivotally supported by said carrier at regular intervals so that, by pivoting with respect to said carrier said tools can occupy either of two different positions with respect to said carrier, one in which they act on the ground during the movement of said carrier and the other in which they are kept apart from the ground, and control means mounted on said frame along the path of said movable carrier so as to act on said tools for selectively modifying the respective positions thereof.

25. A machine of the type described, which comprises, in combination, a frame movable on the ground, an endless carrier mounted in said frame and movable in a substantially vertical plane, means for moving said carrier when said frame is displaced along the ground, tools pivotally supported by said carrier at regular intervals so that, by pivoting with respect to said carrier said tools can occupy either of two different positions with respect to said carrier, one in which they act on the ground during the movement of said carier and the other in which they are kept apart from the ground, control means mounted on said frame along the path of said movable carrier so as to act on said tools for selectively modifying the respective positions thereof, a light source on said frame adapted for emitting light rays onto objects lying on the ground and photo-electric means responsive to the action of said objects on said rays for operating said control means.

ANDRÉ MARIE AUGUSTE FERTÉ.
ANDRÉ BALP.